May 31, 1932. E. O. BRACE 1,861,108

INTEGRAL CLUTCH AND TRANSMISSION CONTROL

Filed Jan. 24, 1930

Inventor
Eugene O. Brace
by Wilkinson & Mawhinney
Attorneys

Patented May 31, 1932

1,861,108

UNITED STATES PATENT OFFICE

EUGENE O. BRACE, OF MAYVILLE, NEW YORK

INTEGRAL CLUTCH AND TRANSMISSION CONTROL

Application filed January 24, 1930. Serial No. 423,123.

The present invention relates to improvements in integral clutch and transmission control, and has for an object to provide, in conjunction with the transmission speed shifting mechanism, a device for primarily disengaging the clutch without the necessity of having to independently release the same with the foot, whereby there will be a coordinate movement between the clutch and transmission, and whereby the control of the same may be more simple and governed from a single point.

Another object of the invention is to provide a simple, compact and faithfully operating device of the character above referred to.

With the foregoing and other objects in view, the invention will be more fully described hereinafter, and will be more particularly pointed out in the claim appended hereto.

Figure 1:
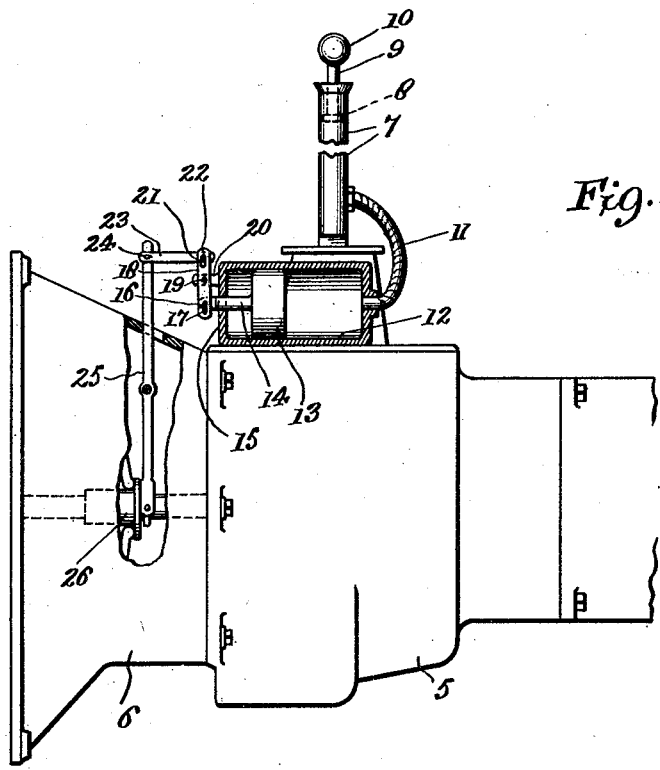
Figure 2:
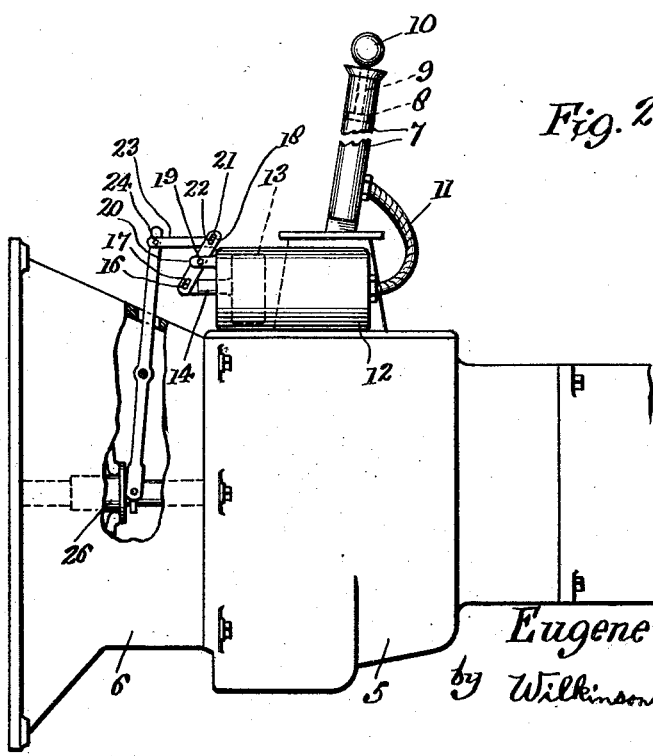

In the drawings, wherein like symbols refer to like or corresponding parts throughout the several views, Figure 1 is a fragmentary side elevation of a transmission with parts broken away, and parts shown in section and illustrating the improved device in conjunction therewith, and Figure 2 is a sectional view with the parts in a subsequently shifted position.

Referring more particularly to the drawings, 5 designates the transmission case containing the usual change speed gears now commonly found on motor vehicles, and 6 represents the clutch housing.

In accordance with the present invention, the gear shift lever 7 is made of hollow tubular construction, and it receives a plunger 8 connected to the plunger rod 9, extending up through the upper portion of the gear shift lever and having a ball or handle 10 for engagement by the hand of the driver or chauffeur.

A flexible metal or other hose or tube 11 is coupled between the lower portion of the hollow gear shift lever 7 and a cylinder 12 containing a piston 13. Preferably the diameter of the cylinder 12 is greatly in excess of that of the gear shift lever 7. The piston 13 has a reciprocating movement within the cylinder 12 and is coupled to a piston rod 14 projecting out through the cylinder head 15 where it is provided with a pin 16 engaging in an elongated slot 17 provided in the lower end of the lever 18. This lever 18 is fulcrumed, as shown at 19, upon a bracket 20 held by the cylinder 12 or other fixed part. The lever 18 is preferably pivoted at its intermediate portion. At its upper end, it is provided with a slot 21 receiving the pin 22 upon a link 23. This link is in turn pivoted at 24 to an elongated lever 25 which extends into the clutch housing and is coupled to the clutch throw-out collar 26.

In the operation of the device, in Figure 1 the gear shift lever 7 is shown as in neutral position, with the plunger 8 raised and the piston 13 at a right hand position. Prior to the movement of the gear shift lever 7, necessary for shifting the transmission into low, second, high, reverse or other speed ratio, the handle 10 and with it the plunger 8 are depressed, as shown in Figure 2, thus pushing the fluid or liquid contained in the system down from the hollow gear shift lever 7 through the tube 11 and into the cylinder 12 where, by virtue of the differential diameters, the same will acquire sufficient power to move the piston 13 to the position shown in Figure 2, thus swinging the levers 18 and 25 and the connected link 23, and accomplishing the movement of the clutch throw-out collar necessary for the disengagement of the clutch.

As soon as the clutch is disengaged, the shift may be made with the gear shift lever 7; whereupon the ball or handle 10 may be elevated to permit of reengagement of the clutch.

It will be appreciated from the foregoing that due to the arrangement used, the clutch operating mechanism is both flexible and faithful in operation, and shall permit of an exceedingly compact structure cooperating with the conventional mechanism of the present day automobile.

The spring associated with the clutch will, of course, restore the parts to the initial position, but there will be no effect on the shifted position of the gear shift lever 7.

It will be obvious that many changes in the construction, combination and arrangement of parts could be made, which could be used without departing from the spirit of my invention, and I do not mean to limit the invention to such details, except as particularly pointed out in the claim.

Having thus described my invention, what I claim, and desire to secure by Letters Patent of the United States is:—

In combination with a gear shift transmission and a clutch operating member, a hollow gear shift lever, a manually operable plunger therein, a cylinder containing fluid, a tube communicating with the hollow gear shift lever and the cylinder, said fluid being controlled by the plunger in said hollow gear shift lever, a piston mounted in said cylinder, said piston being coupled to a piston rod for connection to the clutch operating member, said piston and piston rod being controlled by the movement of the fluid in the cylinder, a lever fulcrumed adjacent said cylinder and coupled loosely to said piston, a link loosely coupled to said lever, and a second elongated lever coupled to said link and to the clutch operating member.

EUGENE O. BRACE.